(12) United States Patent
Allio

(10) Patent No.: US 6,574,042 B2
(45) Date of Patent: *Jun. 3, 2003

(54) AUTOSTEREOSCOPIC IMAGING DEVICE AND SYSTEM COMPRISING IT

(76) Inventor: Pierre Allio, 81 rue de la Mare, 75020 Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,395

(22) PCT Filed: May 5, 1997

(86) PCT No.: PCT/FR97/00786

§ 371 (c)(1),
(2), (4) Date: Nov. 9, 1998

(87) PCT Pub. No.: WO97/43680

PCT Pub. Date: Nov. 20, 1997

(65) Prior Publication Data

US 2001/0050813 A1 Dec. 13, 2001

(30) Foreign Application Priority Data

May 9, 1996 (FR) .............................................. 96 05777

(51) Int. Cl.$^7$ .......................... G02B 27/22; H04N 13/04
(52) U.S. Cl. ....................... 359/463; 359/462; 359/464; 348/59
(58) Field of Search ................................ 359/462, 463; 348/51, 54, 59; 352/57

(56) References Cited

U.S. PATENT DOCUMENTS 2,021,162 A * 11/1935 Walton ..................... 359/463
3,688,045 A * 8/1972 Ohkoshi .................... 359/463
3,932,699 A    1/1976 Tripp
4,783,133 A   11/1988 Chen
4,957,351 A *  9/1990 Shioji ....................... 359/463

FOREIGN PATENT DOCUMENTS

WO    WO 94 25891 A    11/1994
WO    WO 94 26071 A    11/1994

OTHER PUBLICATIONS

Casse, Martin et al.., "Optical design of the FUEGOS high resolution multiple fibre specotrograph", *Instrumentation in Astronomy VII*, SPIE—The International Society for Optical Engineering, vol. 2198.

* cited by examiner

Primary Examiner—Audrey Chang
(74) Attorney, Agent, or Firm—Alston & Bird LLP

(57) ABSTRACT

A device for forming an autostereoscopic image having n viewpoints, the device including a lens array ($RL_1$) comprising cylindrical lens (10) having longitudinal axes parallel to a direction (zz') perpendicular to an optical axis (x'x) of the device. The device includes a cylindrical optical assembly whose longitudinal axis is perpendicular to zz' and to xx'. The lens array ($RL_1$) comprises n cylindrical lens (10). The lens array ($RL_1$) and the cylindrical optical assembly ($LC_1$) share a common focusing plane (P) corresponding to a focusing distance Δ. The absolute value of the ratio between the focal length of the cylindrical optical assembly and that of the lens array is substantially equal to n. Also provided is projection device implementing said image-forming device, and a projector projecting n flat elementary images, and a screen fitted with at least a projection array.

22 Claims, 5 Drawing Sheets

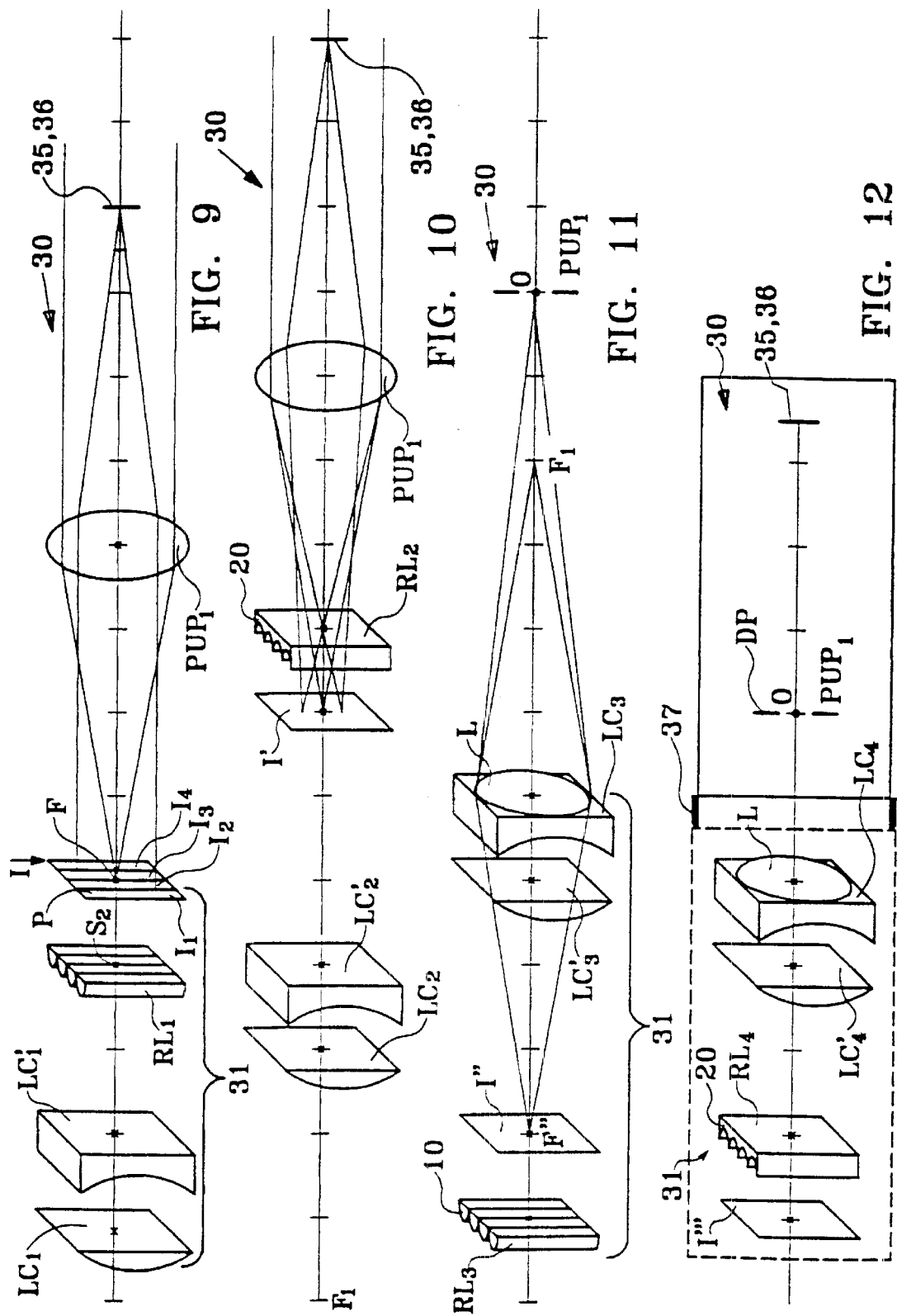

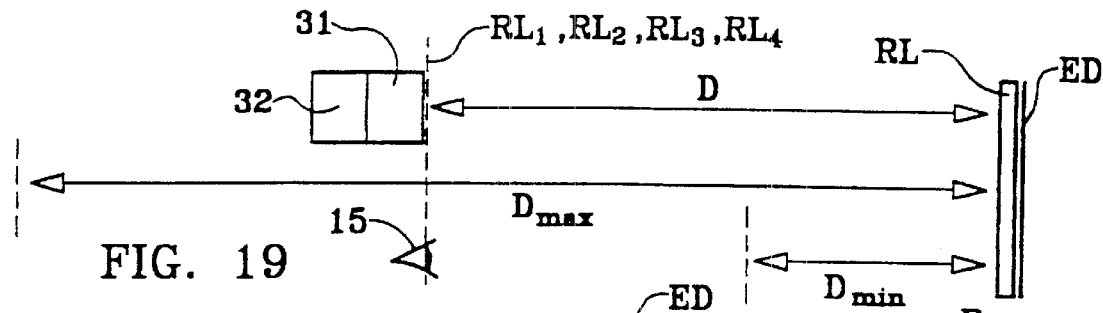
FIG. 19
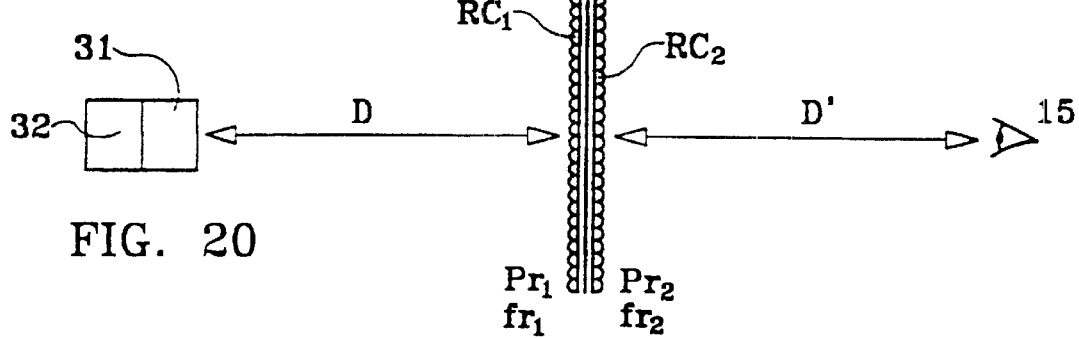
FIG. 20
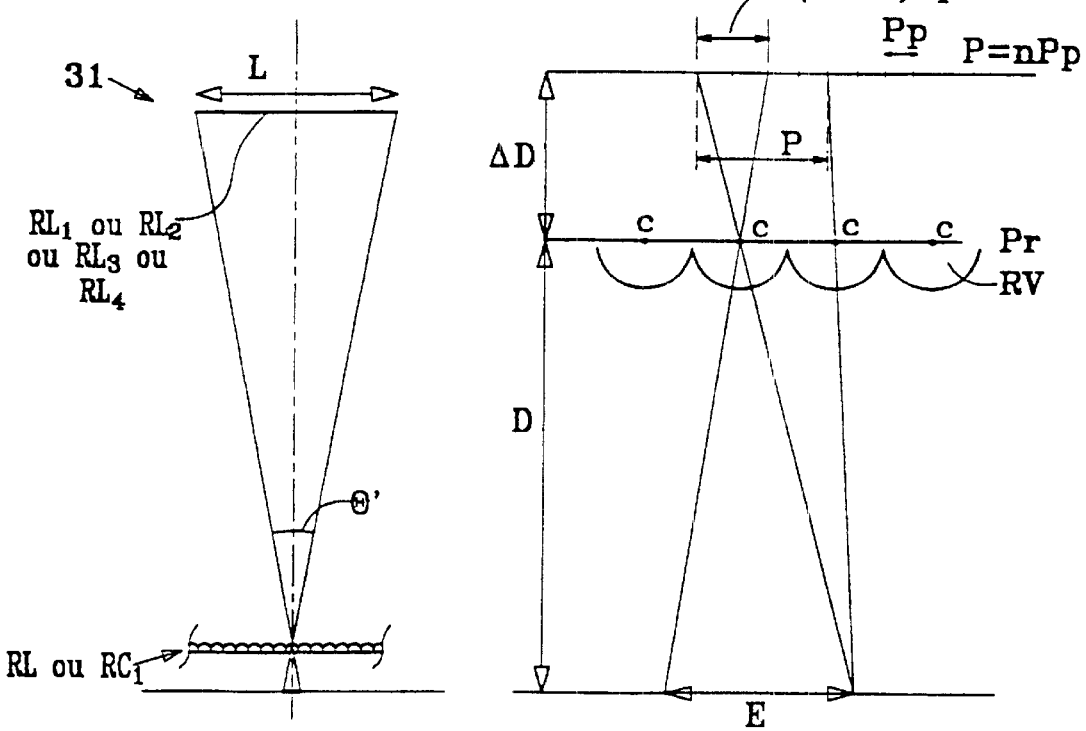
FIG. 21
FIG. 22

AUTOSTEREOSCOPIC IMAGING DEVICE AND SYSTEM COMPRISING IT

FIELD AND BACKGROUND OF THE INVENTION

The present invention relates to an autostereoscopic image-forming device comprising n viewpoints (or elementary images), said device including a lens array comprising elementary cylindrical lenses referred to as cylindrical "lenticles", placed side by side parallel to a first direction.

It is known that such devices have been implemented to constitute autostereoscopic cameras, specifically the autostereoscopic picture-taking devices described in the Applicant's following patents: U.S. Pat. No. 5,099,320, and French patents FR-2 705 007 and 2 704 951.

Those picture-taking devices implement a lens array having a large number of cylindrical lenticles placed side by side, and in practice, the video image is obtained in interleaved manner in the form of columns of pixels, the first elementary image being constituted by the pixels of the first column of pixels together with the pixels in the other columns offset therefrom modulo n, the second elementary image being made up of the pixels of the second column and of columns that are offset modulo n therefrom, and so on, each lenticle being of a width that corresponds to n columns of pixels.

The term "row" and "column" respectively designate the horizontal lines and the vertical lines of pixels as seen by a standing or sitting observer, independently for example of the horizontal or vertical scanning direction of a display cathode ray tube (CRT). For example, for a CRT screen whose scan lines extend vertically, such "scan lines" are considered to be "columns" in the meaning of the present text.

The quality of those picture-taking devices depends on the quality with which the lens array is made, which array has N/n lenticles, N designating the number of pixels in a video image line in the chosen standard.

As described in the above-specified French patents, an image transfer device makes it possible to use a lens array of dimensions that are about ten times greater than the dimensions of a sensor comprising a charged coupled device (CCD), thereby facilitating practical implementation.

Such a lens array thus has a large number of cylindrical lenticles, with the number of lenticles depending both on the chosen video standard (SECAM, PAL, NTSC, HDTV, etc.) and on the number of viewpoints. Unfortunately, the required accuracy of positioning is proportional to the number of lenticles.

In addition, video applications that require miniature cameras, e.g. endoscopes, require the dimensions of the lens array to be reduced very considerably, thereby making implementation much more complicated or even impossible.

SUMMARY OF THE INVENTION

An object of the present invention is thus to provide an autostereoscopic image-forming device and in particular a picture-taking device which is relatively simple to make and to adjust, and which in particular lends itself well to miniaturization, in particular for endoscopy.

The invention thus provides a device for forming an autostereoscopic image having n viewpoints (or elementary images), said device including a lens array comprising cylindrical lenticles disposed side by side and having longitudinal axes parallel to a first direction perpendicular to an optical axis of the device, the device being characterized in that it includes a cylindrical optical assembly comprising at least one cylindrical lens whose longitudinal axis is perpendicular to the first direction and to said optical axis, in that the lens array includes n cylindrical lenticles, in that the lens array and the cylindrical optical assembly share a common focusing plane corresponding to a focusing distance $\Delta$, and in that the absolute value of the focal length of the cylindrical optical assembly is substantially equal to n times the absolute value of the focal length of the lens array. For focusing at infinity ($\Delta=\infty$), the common focusing plane is a focal plane common to the lens array and to the cylindrical optical assembly.

In the invention, the lens array now has only n cylindrical lenticles of pitch p, e.g. n=4, compared with the large number of lenticles implemented in the prior art picture-taking devices, i.e. N/n, e.g. 144 cylindrical lenticles for N=576 and n=4.

In addition, in the device of the invention, the stereoscopic observation baseline can be equal to twice the pitch p of the cylindrical lenticles, i.e. for n=4, to half the width L of the array. In the autostereoscopic system of the invention, e.g. having a number of viewpoints lying in the range 3 to 6, the offset between two adjacent viewpoints (or elementary stereoscopic baseline) can be equal under optimized observation conditions to half the offset E between the eyes of an observer (E=65 mm). More generally, it can be equal to half the chosen stereoscopic baseline B.

At the nominal observation distance (which is the distance at which solid color should theoretically be seen), the observer sees (for n=4) a stereoscopic pair made up in the invention by the first and third viewpoints $I_1$ and $I_3$, or else by the second and fourth viewpoints $I_2$ and $I_4$. Choosing parameters in this way so that a stereoscopic pair is made up of not of two adjacent viewpoints but of two viewpoints having an intermediate viewpoint interposed therebetween (or indeed m, where m>1, intermediate viewpoints in which case the elementary stereoscopic baseline between two adjacent viewpoints is equal to the pitch p of the picture-taking lens array which is equal to B/(m+1)), thereby enabling an observer without special eyeglasses to have a viewing volume enabling the observer to move both parallel and perpendicularly to the display screen, which characterizes uniform autostereoscopy in the meaning of the present application.

As a result, and referring to the above example, an observer at the theoretical solid color distance can move towards the screen or away from it or can indeed move sideways without losing stereoscopic vision.

Once the image has been frozen on the screen, if the spectator moves towards the display screen from the nominal observation distance (or the theoretical solid color distance), the stereoscopic baseline actually seen grows while if the observer goes away from the screen, then the baseline shrinks, and the overall sensation is constant because this variation in the stereoscopic baseline compensates exactly for variation in the sensation of depth associated with modifications to the vergence force, i.e. the muscular force exerted to bring the two retinal images into correspondence so as to obtain the stereoscopic fusion that is required for relief to be perceived, which modification to vergence force necessarily accompanies displacement in the direction perpendicular to the screen.

Once the "solid color" has been adjusted so that the observer sees viewpoints [($I_1$) and ($I_3$)] or [($I_2$) and ($I_4$)] and the observer comes close enough to the display screen, then the observer will see viewpoints ($I_1$) and ($I_4$) and will no longer be free to move parallel to the screen, as happens in reality when looking from close up. When the observer goes away from the screen, then the perceived viewpoints will be [($I_1$) and ($I_2$)] or [($I_2$) and ($I_3$)] or [($I_3$) and ($I_4$)] and the observer can make large movements, thus leaving the observer free to move in a volume.

The same applies, but with improved comfort, when m is chosen to be greater than 1.

For a miniature camera or for endoscopy, the picture-taking stereoscopic baseline B is much smaller than the distance between the pupils of an observer because of the desired large magnification. For n=4, the lenticle pitch p nevertheless remains equal to half the required picture-taking stereoscopic baseline B.

Naturally this remains true for an objective lens of long focal length, for which the stereoscopic baseline B is selected to be greater than the distance E between the pupils of the observer.

In the present invention, the total stereoscopic baseline $B_T$, i.e. the stereoscopic baseline between the viewpoints that are furthest apart is equal to (n−1)p.

In the prior art according to the above-specified French patents, the total stereoscopic baseline is equal to the pupil diameter of the picture-taking objective lens.

In other words, other things being equal, the pitch and thus the size of the cylindrical lenticles in the present invention is $N/n^2$ times greater than the pitch or size of the cylindrical lenticles in the prior art picture-taking devices. For n=4, they are 36 times larger than in the above-specified example (N=576 and n=4).

In a first embodiment, the cylindrical optical assembly is converging and the lens array is also converging.

In a second embodiment, the cylindrical optical assembly is converging while the lens array is diverging.

In a third embodiment, the cylindrical optical assembly is diverging while the lens array is converging.

And finally in a fourth embodiment, the cylindrical optical assembly is diverging and the lens array is also diverging.

In order to correct the anamorphosis ratio (or magnification ratio) of the system whose nominal value is equal n, but which varies slightly as a function of focusing distance, the absolute value of said ratio between the focal length of the cylindrical optical assembly and the focal length of the lenticles of the lens array is equal to n*, where n* is equal to nk, k being a magnification ratio correction coefficient such that for an object situated at a given distance, each of the viewpoints of the image has an anamorphosis ratio whose absolute value is equal to n.

In particular, and in a preferred embodiment, k varies as a function of the focusing distance and is selected so that the anamorphosis ratio is equal to n at the focusing distance.

In particular, the cylindrical optical assembly may have variable focal length. To this end it may comprise two cylindrical lenses (generally one converging lens and one diverging lens) forming a converging or diverging doublet depending on whether the cylindrical optical assembly is converging or diverging, together with means for varying the spacing of the two cylindrical lenses of the doublet so as to modify the focal length of the cylindrical optical assembly and thus modify the value of the correction coefficient k by varying the focal length of the doublet, while keeping the focusing planes of the cylindrical optical assembly and of the lens array in coincidence.

It is advantageous for the device to include a converging field lens having a focus located, for example, in the focusing plane common to the lens array and to the cylindrical optical assembly. Preferably, said field lens serves to converge the light rays that are parallel to said optical axis and passing through the centers C of the lenticles of the lens array onto a common point O advantageously situated in the entrance pupil of the transfer optical system, in other words it serves to converge the rays passing through the optical centers C of the lenticles of the lens array into the entrance pupil of the transfer optical system.

In particular, the field lens serves to avoid the phenomenon of vignetting, particularly when taking close-ups.

In a preferred embodiment, the device of the invention includes, downstream from each lenticle of said lens array, at least one plane surface that is inclined relative to a plane normal to the optical axis using angles such that light rays parallel to the optical axis and passing through the optical centers of the lenticles converge on a common given convergence point O. This serves to provide the field lens function without influencing the optical parameters of the device.

The device of the invention can constitute an element of a picture-taking device, which may be a video camera or a cinema camera, having an optical transfer system that enables said image to be centered and brought into focus.

The device of the invention, is advantageously coupled to a device for transferring the autostereoscopic image in air, including means for focusing on a video sensor such as a CCD, in particular a three-color CCD or the surface of a film.

The device of the invention can constitute a picture-taking device of a video endoscope or indeed of a videophone. With an endoscope, the image-forming device and the image-transferring video device are incorporated in the head of the endoscope. The stereoscopic baseline is generally smaller than the distance between the pupils of an observer. Video signals in "n-image" mode are relayed by cable, in particular optical fiber cable, with the advantages mentioned in the above-specified French patents, so as to enable them to be viewed and/or recorded.

With a videophone, the image-forming device and the video-transfer device constitute a single picture-taking camera which relays video images in n-image mode by cable or radio to enable them to be recorded and/or displayed, e.g. on a monitor screen fitted with a display array.

It is particularly advantageous for the video image-transferring device to be a video camera such as a camcorder focused on said image. The image-forming device of the invention under such circumstances constitutes an optical accessory for the video camera to which it can be fitted by means of an adaptor ring.

In application to cinema, the device of the invention is advantageously coupled to a device for transferring said autostereoscopic image in air including means for focusing on a film. The transfer device is advantageously a cinema camera focused on said image.

The device can be characterized in that it includes a field lens, or a plane optical surface associated with each lens of the lens array, and in that said given convergence point is situated in the entrance pupil of the transfer optical system.

By applying the principle whereby light paths are reversible, the device of the invention can also be used as an element for recombining images from a projector or back-projector device whether using video techniques or cinema techniques.

The invention thus also provides a device for projecting images, either directly or by back-projection, the device including an image-forming device as defined above, said common focusing plane constituting an object focusing plane, a projector projecting an image including n flat elementary images of anamorphic format framed in the object focusing plane, and a screen fitted with at least one projection array such as a lens array or a parallax array, said projection array being situated at a distance D from the lens array of the image-forming device which is equal to the nominal viewing distance. The cylindrical lens and the lens array of the image-forming device are positioned in such a manner that the image situated in the object focusing plane is projected to the distance D by the image-forming device. The field angle of the elements of the projection array is such that each element frames the lens array of the image-forming device horizontally, and said lens array has two non-contiguous lenticles whose axes are spaced apart by the distance between the pupils of an observer.

Said screen may be a direct projection screen having a diffusing and reflecting element with the projection array placed in front thereof, which array also constitutes a viewing array.

Said screen may be a back-projection screen including a projection array and a display array, with a diffusing element being disposed between them.

Finally, the invention provides an autostereoscopic video system including a picture-taking device as defined above and a projection device as defined above.

BRIEF DESCRIPTION OF THE DRAWINGS

Other characteristics and advantages of the invention appear more clearly on reading the following description given by way of non-limiting example with reference to the accompanying drawings, in which:

FIGS. 9 to 12 show devices corresponding respectively to FIGS. 1 to 4 and including a transfer system;

FIGS. 19 and 20 show respectively a projection device and a back-projection device of the invention;

FIG. 21 is a diagram showing how the field angle of a cylindrical lens of a projection array or of a back-projection array is determined; and FIG. 22 shows the "solid color" condition for viewing a CRT.

DESCRIPTION OF ILLUSTRATIVE EMBODIMENTS

Figure 1:
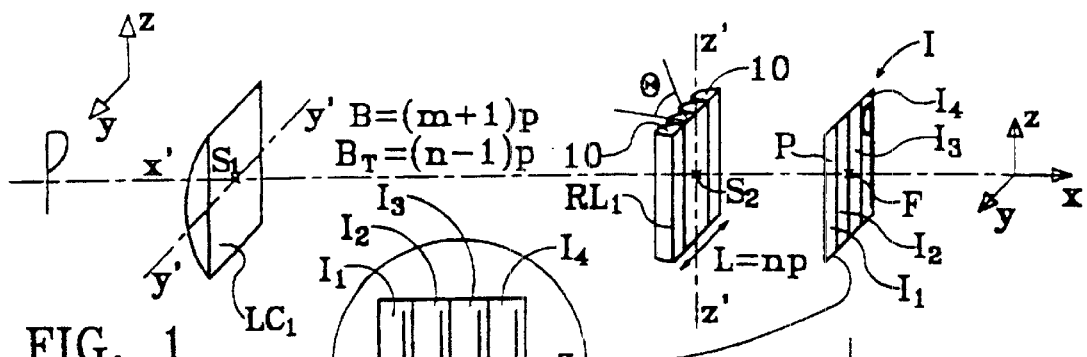
FIGS. 1 to 4 show the first, second, third, and fourth embodiments of the invention, respectively.

In FIG. 1, a device of the invention, which is equally suitable for use as a picture-taking device and, by reversing light paths, as a projection device, comprises in succession: a converging cylindrical lens $LC_1$ having an optical center $S_1$ situated on the horizontal optical axis x'x, and whose longitudinal axis y'y is horizontal and perpendicular to x'x; and a converging lens array $RL_1$ having n convex cylindrical lenticles 10 that touch one another at pitch p (where n=4), each of the lenticles having a longitudinal axis that is parallel to the vertical axis z'z passing through the optical center $S_2$ situated on the optical axis x'x.

To focus at infinity, the converging cylindrical lens $LC_1$ and the converging lens array $RL_1$ have the same focal plane P which intercepts the axis x'x at the focus F.

In addition, the ratio between the focal lengths $S_1F$ and $S_2F$ of the cylindrical lens $LC_1$ and of the lens array $RL_1$ is substantially equal to n, i.e., in the above example $S_1F$ is equal to 4 times $S_2F$.

Under such conditions, and as explained below in the description, the image obtained in the focal plane P has an anamorphosis ratio substantially equal to n between the vertical component and the horizontal component of each of the elementary images $I_1$, $I_3$, $I_3$, and $I_4$. The image I obtained in this way thus comprises four juxtaposed and touching plane images of anamorphic format $I_1 \ldots I_4$ which correspond to the "n-image" mode of the above-mentioned French patents. The total stereoscopic baseline $B_T$ is equal to (n−1)p.

The image I can be transferred in air by an image-transfer device associated with an entrance objective lens placed upstream from the image-forming device.

Nevertheless, it is highly preferable to omit an entrance objective lens and to associate the image-forming device with a transfer optical system as described below.

The image on a CCD sensor, or on a film, is obtained directly in n-image mode. In accordance with the teaching of those patents, the image can also be interleaved in columns of image points or "pixels" so as to obtain an autostereoscopic image having n interleaved viewpoints (or elementary images) that can then be displayed on a screen, for example a television screen, having a cylindrical array such as a lens array placed in front of it.

Similarly, back-projection can be obtained directly from flat images in anamorphic format $I_1$, $I_2$, $I_3$, and $I_4$ in application of the teaching of the above-specified French patents.

The considerations of the above two paragraphs are naturally also applicable to the second, third, and fourth embodiments as described below.

Figure 2:
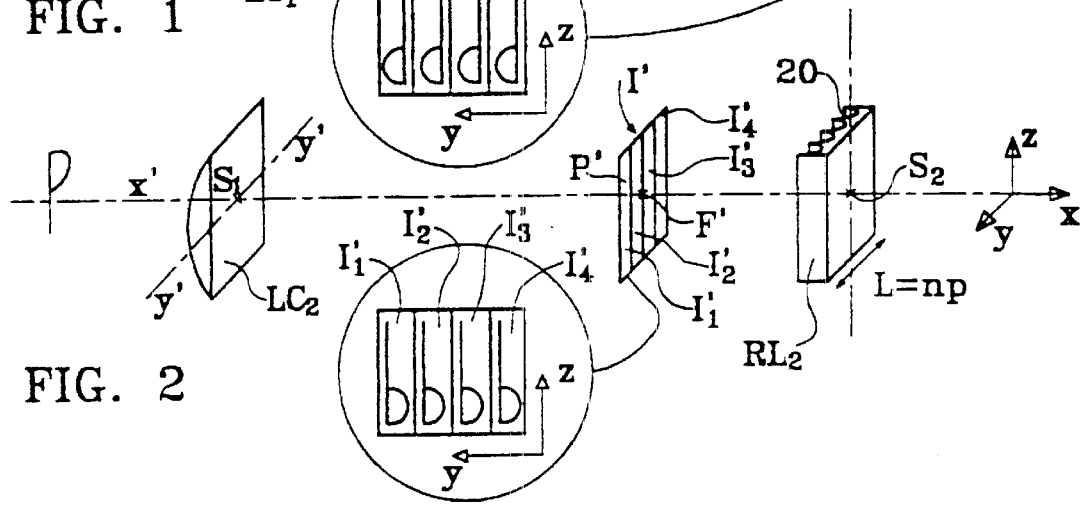

The second embodiment of the invention as shown in FIG. 2 implements a converging cylindrical lens $LC_2$ of horizontal axis perpendicular to the axis x'x, and a diverging lens array $RL_2$ having n contiguous vertical-axis concave cylindrical lenticles 20. The lens $LC_2$ and the array $RL_2$ have a common focal plane P' which is situated between the cylindrical lens $LC_2$ and the lens array $RL_2$. The plane P' intersects the optical axis x'x at the focus F' and the elementary flat images of anamorphic format $I'_1$, $I'_3$, $I'_3$ and $I'_4$ are images in which the horizontal component is virtual and the real component is real.

To obtain an anamorphosis ratio that is substantially equal to n between the horizontal and vertical components of the elementary images, the ratio between the focal lengths of the cylindrical lens $LC_2$ and of the elementary lenticles of the lens array $RL_2$ is selected as in the preceding case to be substantially equal to −n, i.e. $S_1F'=-nS_2F'=-4S_2F'$ (in the example described).

The third embodiment implements in succession: a converging lens array $RL_3$ having n vertical axis converging elementary lenticles 20; and a diverging cylindrical lens $LC_3$ that is crossed relative to the array $RL_3$, i.e. the axis of the lens $LC_3$ is horizontal and perpendicular to the axis x'x. The image I" in the plane P" which is the common focal plane of the lens array $RL_3$ and the cylindrical lens $RC_3$ has four flat anamorphic images $I''_1$, $I''_3$, $I''_3$, and $I''_4$ which are images having a vertical component that is virtual and a horizontal component that is real, and which have an anamorphosis ratio that is substantially equal to −n when seen downstream from the cylindrical lens $LC_3$. As before, the condition is that the ratio of the focal lengths of the cylindrical lens $LC_3$ and of the lens array $RL_3$ should be equal to −n, i.e. $S_2F'''=-nS_1F''=-4S_1F''$ (in the example described).

Finally, the fourth embodiment implements in succession: a diverging lens array $RL_4$ comprising n vertical axis diverging lenticles 20; and a diverging cylindrical lens $LC_4$ which is crossed relative to the lens array $RL_4$. The image I''' is a virtual image situated in the focal plane P''' common to the lenticles of the lens array $RL_4$ and to the diverging lens $LC_4$ and including four flat anamorphic images $I'''_1$, $I'''_3$, $I'''_3$, and $I'''_4$. The plane P''' is situated upstream from the lens array $RL_4$ and it intersects the optical axis x'x at the point F'''. As above, the condition for the anamorphosis ratio to be compensated is that the ratio of the focal lengths should be substantially equal to n, i.e. $S_2F'''=nS_1F'''=4S_1F'''$ (in the example shown). This fourth embodiment is the preferred embodiment since it is the embodiment which can be implemented in the most compact manner because of the favorable disposition of the leading dimensions, and also because it does not give rise to image inversion.

In all four above-mentioned embodiments, $S_1$ designates the geometrical center of the converging cylindrical lens $LC_1$ situated on the optical axis x'x, and $S_2$ designates the optical center of the converging lens array $RL_1$ situated on the optical axis x'x.

In each of these embodiments, it is possible to use either a single cylindrical lens ($LC_1 \ldots LC_4$) or else a converging doublet ($LC_1$, $LC'_1$), a converging doublet ($LC_2$, $LC'_2$), a diverging doublet ($LC_3$, $LC'_3$), or a diverging doublet ($LC_4$, $LC'_4$).

Figure 5:
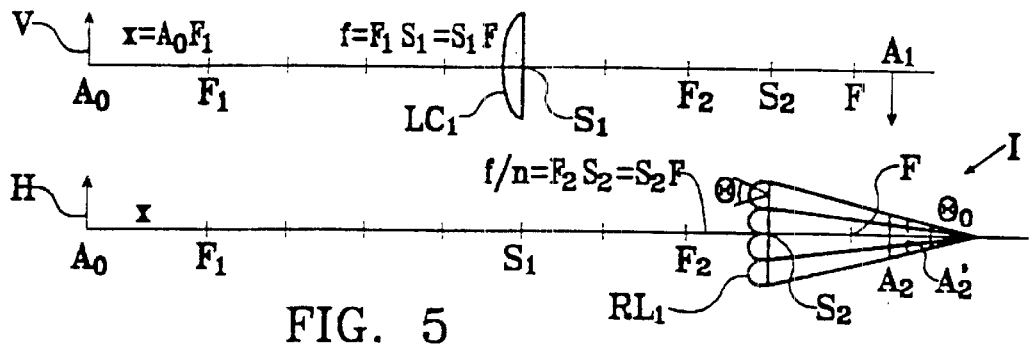
FIGS. 5, 6, 7, and 8 show the optical parameters corresponding respectively to FIGS. 1, 2, 3, and 4 in both the horizontal plane and the vertical plane containing the optical axis.

FIG. 5 correspond to the first embodiment (FIG. 1) and serves to illustrate the elementary parameters thereof, both in the vertical plane (top line of FIG. 5) in which the doublet $LC_1$–$LC'_1$ acts as a converging cylindrical lens, and in which the lens array $RL_1$ can be considered as being a plate having parallel faces, and also in the horizontal plane (bottom line of FIG. 5) in which the lens $LC_1$ can be considered as being a plate having parallel faces, and in which the lens array $RL_1$ is optically active as a converging array having n lenticles 10.

When operating as a picture-taking device, the converging cylindrical lens $LC_1$ (or doublet) has an object focus $F_1$ and an image focus F, and the converging lens array $RL_1$ has an object focus $F_1$ (defined as the intersection between its object focal plane and the optical axis x'x) and an image focus F coinciding with the image focus of the cylindrical lens $LC_1$.

Let there be an object placed at point $A_0$ having a vertical component V and a horizontal component H. The device ($LC_1$, $RL_1$) forms an image of the vertical component V at point $A_1$ and an image of the horizontal component H at point $A_2$.

I.e.:

$$A_0A_1 = L \quad S_1F = -f_1 \quad S_2F = -f_2$$
$$S_1A_1 = p'_1 \quad S_1A_0 = p_1 \quad S_2A_1 = p'2 \quad S_2A_0 = p_2$$

The value of the magnification $g_1$ in the vertical plane is:

$$\gamma_1 = \frac{S_1A_1}{S_1A_0} = \frac{p'_1}{p_1}$$

Also:

-continued $$\frac{1}{S_1A_1} = \frac{1}{S_1A_0} + \frac{1}{SF} \quad \text{i.e.} \quad \frac{1}{p'_1} = \frac{1}{p_1} + \frac{1}{f_1}$$

$$A_0A_1 = -p_1 + p'_1 = L$$

$$-p_1p'_1 = Lf_1$$

It follows that:

$$\gamma_1 = \frac{p'_1}{p_1} = \frac{L - \sqrt{(L^2 - 4Lf_1)}}{-L - \sqrt{(L^2 - 4Lf_1)}} \quad (1)$$

$$= -\frac{1 - \sqrt{(1 - 4f_1/L)}}{1 + -\sqrt{(1 - 4f_1/L)}}$$

A similar calculation shows that the magnification $\gamma_2$ in the horizontal plane has the following value:

$$\gamma_2 = \frac{1 - \sqrt{(1 - 4f_2/L)}}{1 + \sqrt{(1 - 4f_2/L)}} \quad (2)$$

assuming that $A_0A_2=L$.

The anamorphosis coefficient C has the value:

$$C=\gamma_1/\gamma_2 \quad (3)$$

For an object at infinity, the following applies:

$$C = \frac{f_1}{f_2} \quad (4)$$

In other words $C \rightarrow f_1/f_2$ when $L \rightarrow \infty$.

If the ratio $f_1/f_2$ is selected to be equal to n, then the anamorphosis coefficient C is effectively equal to n (e.g. n=4 in the example shown) for an object at infinity.

As the object comes closer, other things remaining equal, the anamorphosis coefficient C tends to increase, but this variation is slow.

In a preferred embodiment, anamorphosis is compensated for the observation distance of the object to be viewed. As a result the anamorphosis coefficient C remains very close to the desired value, i.e. $C \approx n$ over the focusing range.

This compensation is performed by calculating the value of the ratio $n^*=f_1/f_2$ that would provide an anamorphosis ratio C=n at the observation distance $A_0S_1$ of the object $A_0$ in FIG. 5.

EXAMPLE I

The following values are selected:

$$\gamma_1 = -0.1 \text{ with}$$

$$p_1 = -3 \text{ m} \quad p'_1 = 0.3 \text{ m whence } f_1 = 0.272 \text{ m}$$

$$\gamma_2 = -0.1/n = -0.1/4 = -0.025 = p'_2/p_2$$

$$-p_2 + p'_2 = 3.3 \text{ m}$$

$$-p_2 + \gamma_2 p_2 = 3.3 \text{ m}$$

$$\text{whence } p_2 = \frac{-3.3}{1 + 0.025} = -3.22 \text{ m}$$

$$p_2 = -3.22 \text{ m} \quad p'_2 = 0.08 \text{ m}$$

-continued $$\frac{1}{0.08} = -\frac{1}{3.22} + \frac{1}{f_2'} \quad f_2' = 0.0785 \text{ m}$$

whence $\frac{f_1'}{f_2'} = \frac{0.272}{0.0785} = 3.465 = n^* = 4 \text{ k}$

When the anamorphosis ratio C is exactly compensated for an object situated at 3 meters (m) from the cylindrical lens $LC_1$, the ratio C is equal to 3.465 for an object situated at infinity, using above formula (4), i.e. ΔC/C=13.3% and k=0.866.

For an object situated at 2 m, then C=4.55, i.e. ΔC/C=13.8%.

For an anamorphosis coefficient that is exactly compensated at 3 m (C=4), the coefficient ΔC/C lies in the range ±13% approx. from 2 m to infinity, which is entirely compatible with good quality picture-taking. Such deformation is progressive and it difficult for the observer to perceive. It can be compensated as a function of focusing distance, as indicated below.

It should be observed that when performing projection or back-projection, the projection coefficient k can be involved and it is thus the product of the coefficients k used when taking the picture and/or when projecting (or back-projecting it) that needs to be taken into account.

Figure 6:
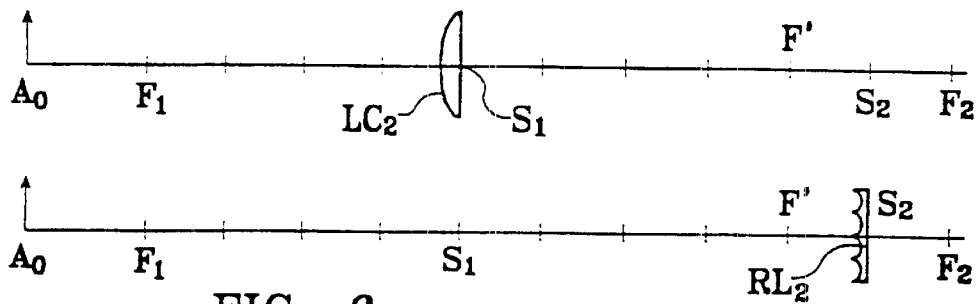
Figure 7:
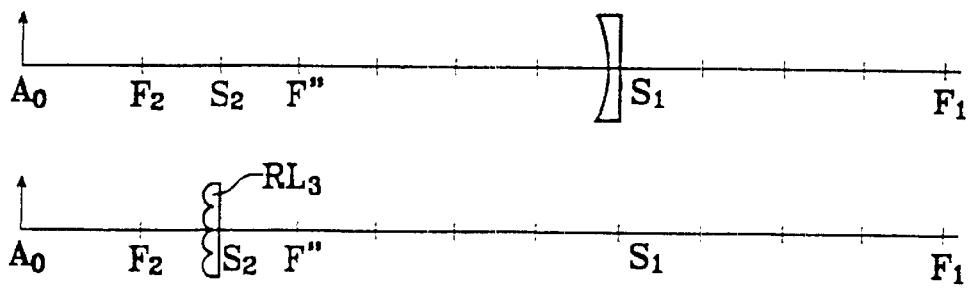
Figure 8:
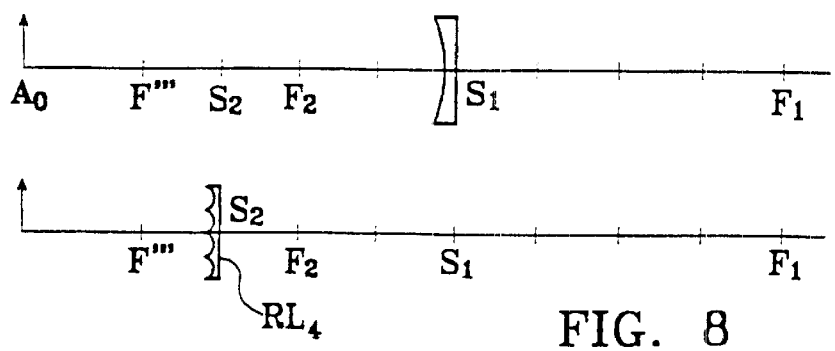

The formula giving the values for $\gamma_1$ and $\gamma_2$ and the anamorphosis ratio C is the same in each of the second, third, and fourth embodiments (see FIGS. 6, 7 and 8). For a converging cylindrical lens, the focal length is positive, and it is negative for a diverging lens.

In FIG. 6, $F_1$ designates the object focus of converging lens $LC_2$, F' the image focus of converging lens $LC_2$ and the image focus of diverging lens array $RL_2$, and $F_2$ designates the object focus of the lens array $RL_2$. The value of the anamorphosis ratio C is negative.

In FIG. 7, $F_2$ designates the object focus of the converging lens array $RL_3$, F' designates the image focus of the converging lens array $RL_3$ and the image focus of the diverging cylindrical lens $LC_3$, and $F_1$ designates the object focus of the cylindrical lens $LC_3$. The value of the anamorphosis ratio C is negative.

Finally, in FIG. 8, F' designates the image focus of the diverging lens array $RL_4$ and the image focus of the diverging cylindrical lens $LC_4$, $F_2$ designates the object focus of the diverging lens array $RL_4$, and $F_1$ designates the object focus of the diverging cylindrical lens $LC_4$. The value of the anamorphosis ratio is positive. linda Focusing at 4 meters (L=4) is illustrated in the following numerical example where above formulae (1) to (3) are used for calculating the value of $f_2$.

EXAMPLE II

Converging Cylindrical Lens & Converging Lens Array (FIGS. 1 and 5), with $f_1$=0.1 m.

To obtain an anamorphosis coefficient C=4 with focusing at 4 m, calculation shows that the lenses of the converging lens array must have a focal length $f_2$=0.2598 m, i.e. $n^*=|f_1/f_2|=3.85$, i.e. $k=n^*/N=0.96$.

EXAMPLE III

Converging Cylindrical Lens & Diverging Lens Array (FIGS. 2 and 6), with $f_1$=0.1 m.

To obtain an anamorphosis coefficient C=−4 with focusing at 4 m, calculation shows that the lenticles of the diverging lens array must have a focal length $f_2$=−0.0267 m, whence $n^*=|f_1/f_2|=3.75$, i.e. k=0.94.

EXAMPLE IV

Figure 3:
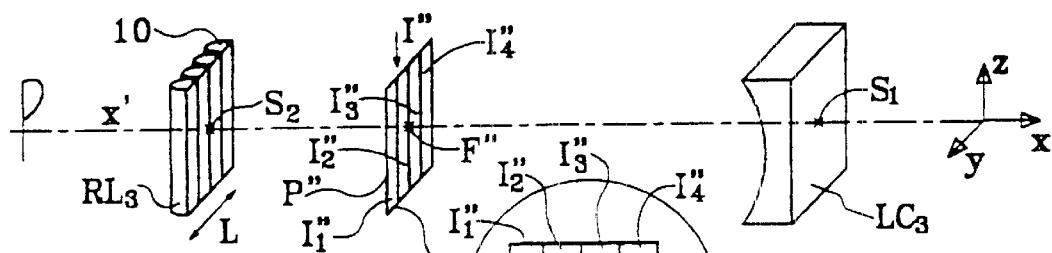

Diverging Cylindrical Lens & Diverging Lens Array (FIGS. 3 and 7) with $f_1$=−1 m.

To obtain an anamorphosis coefficient C=4 with focusing at 4 m, calculation shows ht the lenticles of the diverging lens array must have a focal length $f_2$=−0.024 m, whence $n^*=|f_1/f_2|4.15$, i.e. k=1.04.

EXAMPLE V

Figure 4:
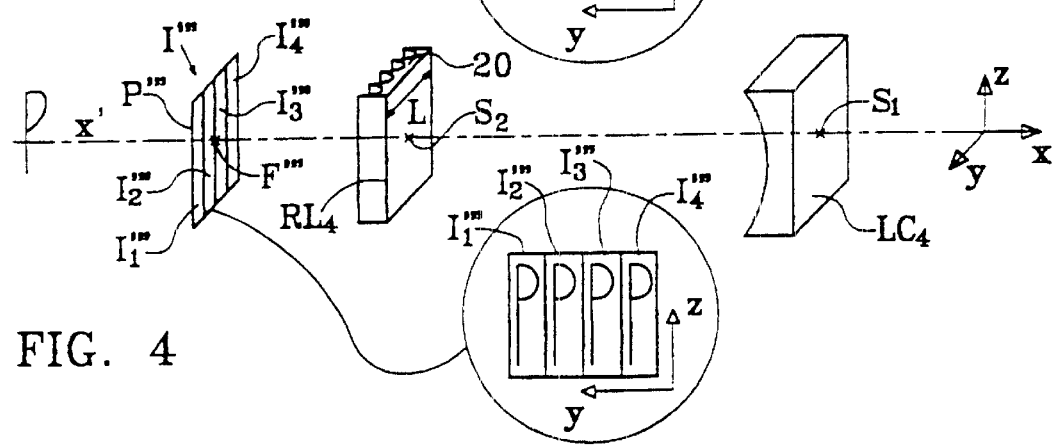

Diverging Cylindrical Lens & Converging Lens Array (FIGS. 4 and 8), with $f_1$=−0.1 m.

To obtain an anamorphosis coefficient C=−4 with focusing at 4 m, calculation shows that the lenticles of the converging lens array must have a focal length $f_2$=0.0235 m, i.e. $n^*=|f_1/f_2|=4.25$ whence k=1.06.

Examples II to V can be summarized by the following table:

| | $f_1$ | |
|---|---|---|
| C | 100 mm | −100 mm |
| 4 | 26 mm | −24 mm |
| −4 | −26.7 mm | 23.5 mm |

Focus at 4 m

In practice, in the embodiments of FIGS. 1, 2, 5, and 6, k can be selected to lie in the range 0.8 to 1 or in the range 0.85 to 1, and preferably in the range 0.9 to 1. In the embodiments of FIGS. 3, 4, 7, and 8, k can be selected to lie in the range 1 to 1.2, or in the range 1 to 1.15, and preferably in the range 1 to 1.1.

The image-forming device 31 may also have a field lens designed to reduce or avoid the phenomenon of vignetting, and to facilitate focusing.

Such devices corresponding respectively to the four embodiments of FIGS. 1 to 4 are shown in FIGS. 9 to 12.

The purpose of using a field lens is to enable rays that are received parallel to the optical axis and that pass through the center C of the lenticles 10 or 20 of the lens array ($RL_1 \ldots RL_4$) to converge on the transfer optical system at a point O situated in the entrance pupil PUP of the transfer optical system.

In the context of the present invention, using a spherical field lens modifies the optical parameters of the system without modifying the anamorphosis ratio.

Figure 13:
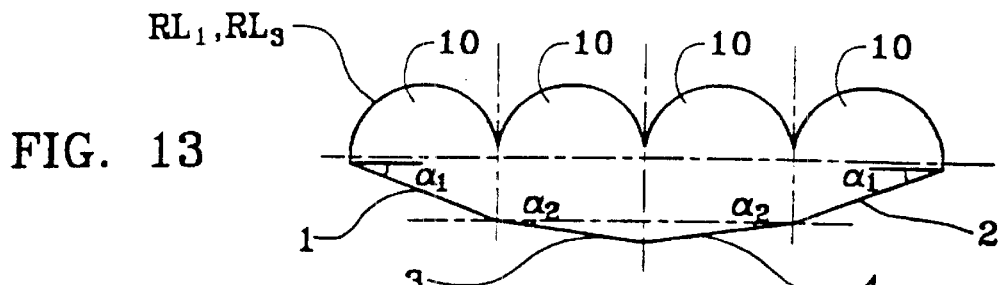
FIGS. 13 to 16 show a preferred embodiment of the invention implementing plane regions for prismatic compensation.
Figure 14:
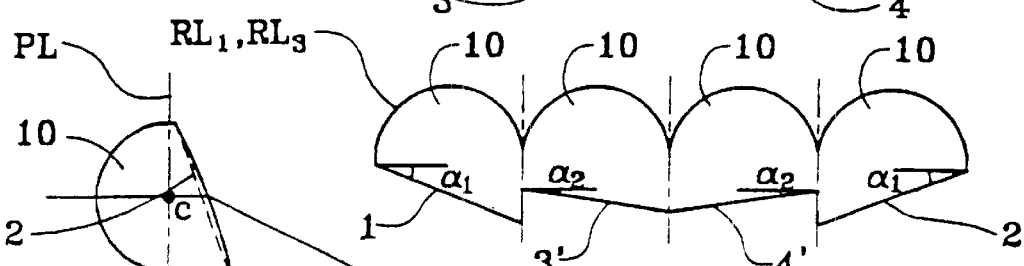
Figure 15:
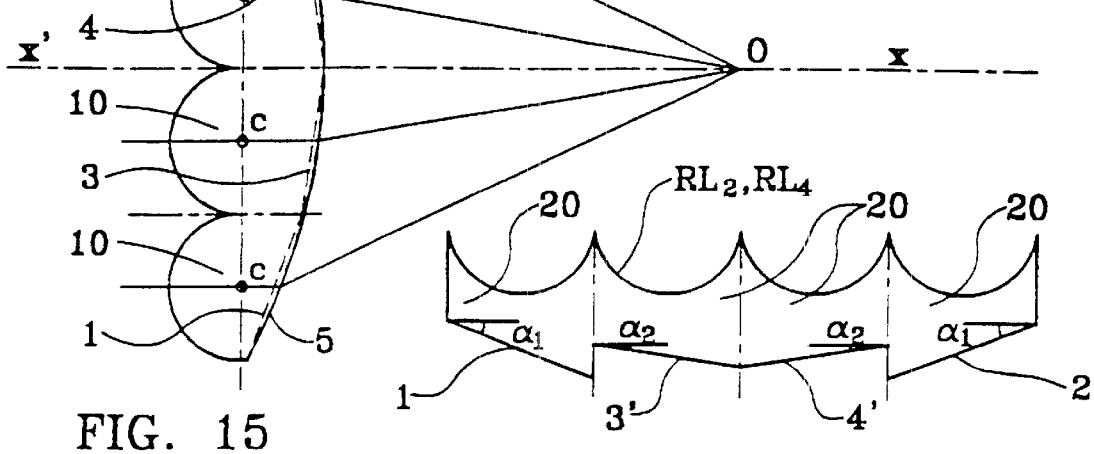
Figure 16:
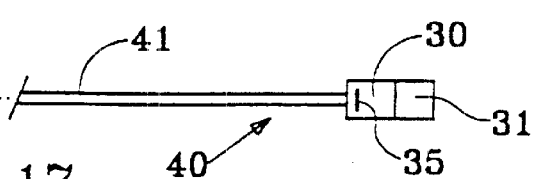

It is possible to implement a cylindrical field lens whose axis is parallel to the axis of the lenticles of the lens array (see FIG. 15). However that has an influence on the anamorphosis ratio. An advantageous solution is to approximate the curvature of the cylindrical field lens by using as many optical surface forming planes 1, 2, 3, 4 (or prisms) as there are lenticles in the cylindrical array, as shown in FIGS. 13 (surfaces 1, 2, 3, 4) and 14 (surfaces 1, 2, 3', 4') for a converging lens array, and as shown in FIG. 16 (surfaces 1, 2, 3', 4', for example) for a diverging lens array.

The inclinations $\alpha_1$ and $\alpha_2$ (where $\alpha_2<\alpha_1$) of the plane surfaces relative to the plane PL connecting the centers C of the lenticles 10 or 20, which plane is perpendicular to the optical axis x'x, is selected in such a manner as to approximate the outline of the converging optical surface 5 whose curvature is selected to cause rays passing through the centers C of the lenticles 10 and 20 and through a point situated on the axis x'x and at a given distance to converge on the point O situated in the entrance pupil P of the transfer optical system.

In each case, in the context of operation as a picture-taking device, the image focus of the field lens LCH is situated at the pupil of a transfer optical system 30 when such an optical system is implemented.

It will be observed that each of the n lenticles making up the lens array has a field angle θ which is equal to the field angle that has been selected for the image. The optical conditions to be satisfied are much simpler than in the prior art according to the above-mentioned French patents. The device of the invention makes it possible to avoid using an entrance objective lens and the parallax problems that result therefrom.

Focusing on an object is performed by acting on the cylindrical optical assembly. When the assembly has an adjustable focal length, e.g. when it includes a doublet, the focal length of the doublet is adjusted while ensuring that said image focal planes of the doublet and of the lens array continue to coincide.

With a doublet, focal length is adjusted by moving the two cylindrical lenses constituting the doublet (one converging lens, one diverging lens) away from each other or towards each other. This displacement can be driven by a stepper motor. When required, the focal planes of the doublet and of the lens array can be kept in coincidence by moving the doublet away from or towards the lens array, and this displacement can likewise be driven by a stepper motor.

In each embodiment, the depth of field that is obtained is very high.

In addition, with a lens array whose lenticles are contiguous, the images $I_1 \ldots I_4$ that are directly obtained in the focal plane of the array are themselves contiguous for a transfer objective lens that performs transfer in air. This is also a consequence of the fact that it is possible to omit an entrance optical system using spherical lenses which, in the prior art, impose the condition of putting the entrance pupil of the objective lens into coincidence with the field of the lenticles, and impose special conditions that needed to be satisfied by the transfer optical system (see the Applicant's above-specified patents).

The device 31 can be associated with a transfer optical system whose optical axis is the axis x'x (see FIGS. 9 to 12). The function of the transfer optical system is to make it possible, in particular, to form a real image on the CCD sensor 35 of a video camera or on a film 36, which particularly in the case of video can have a magnification of less than 1, so as to superpose the image I, I', I", or I'" on the CCD sensor 35 as in the case of the Applicant's above-mentioned French patents.

The transfer optical system 30 is preferably orthoscopic and forms a real image, transferring the image I, I', I", or I'" made up of n elementary images of anamorphic format onto the CCD sensor 35, e.g. a three-color CCD sensor of a video camera so as to obtain a sharp image on the CCD sensor 35 of the video camera (or in the plane of a film 36).

In general, the transfer optical system 30 comprises a diaphragm DP for stopping down the large aperture image supplied by the cylindrical optical system and the lens array. The device 31 comprising both the cylindrical optical assembly and the lens array can constitute a housing which is mounted in the transfer optical system 30 by means of an adaptor ring 37, said transfer optical system possibly being integrated in a video camera such as a camcorder or in a movie camera for use with film.

In video, the magnification of the transfer optical system is selected in such a manner that each image projected onto the CCD sensors by the transfer optical system is of a width equal to N/n pixels of the CCD sensor. Sofar as image magnification is concerned, the accuracy of this match is of the order of the width of one pixel, whereas in the above-mentioned French patents, given the way the images are interleaved, the accuracy that needed to be obtained was, for example, about 100th of a pixel, thereby requiring a special procedure for adjusting the picture-taking device. In addition, with the picture-taking device of the invention, if the image is offset laterally by the width of one pixel, as can happen because of slip or because of vibration, the practical drawback is restricted to a loss of information concerning only the column of pixels common to two adjacent elementary images, and on viewing that is represented by a negligible loss of information at the edge of the image.

When taking pictures on film, the only constraint on the magnification of the transfer optical system is that the real image representing the image I (or I', or I", or I'") has a format that corresponds to the format of the film. As before, the spatial coherence due to the lens array ensures that any offset due to slip or vibration gives rise to effects solely at the edges of the field. This is particularly advantageous, given that until now there has not existed any device for taking stereoscopic pictures on film while using only one optical system for taking the pictures.

Since the stereoscopic baseline is determined by the pitch of the n cylindrical lenticles of the lens array RL, the presence of an optical transfer system having magnification of less than unity is necessary in most video applications, unless a CCD sensor of large dimensions is available or unless a small scene is being taken.

With a macroscopic camera, or an endoscope, or indeed when taking pictures on film, it is possible in all those circumstances to use a transfer optical system that forms in its image focal plane a real image of said common focusing plane, with the CCD sensor or the film being located in the image plane of the transfer optical system, which system can be of arbitrary magnification providing it matches the size of the sensor, and magnification may equally well be less than 1 or greater than 1, and for example it may be close to 1 or even exactly equal to 1.

The transfer optical system has a focal length such that the field perceived corresponds as accurately as possible to the framing of the lens array by the transfer optical system.

Under such conditions, and given that the image is transferred in air, the transfer optical system receives from each lenticle 10 or 20 only those light rays which correspond to each elementary image.

Figure 17:
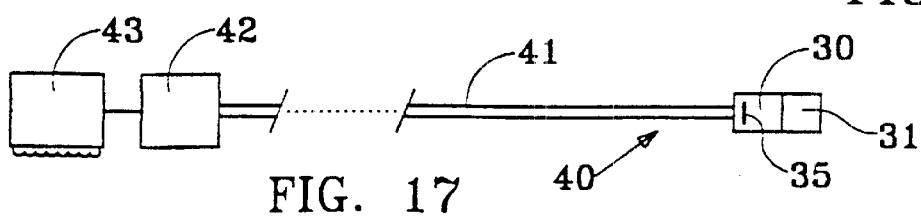
FIG. 17 shows an application of the invention to endoscopes.

FIG. 17 shows the case of an endoscope. The head 40 of an endoscope includes the image-forming device 31 and a transfer optical system 30 which includes a CCD sensor 35. The image is transmitted over the cable 41 (or by a video transmitter) in n-image mode and it is received by a device 42 that performs any image processing for recording thereof and/or that may be necessary for display thereof, e.g. on a television receiver 43 fitted with a lens array.

Figure 18:
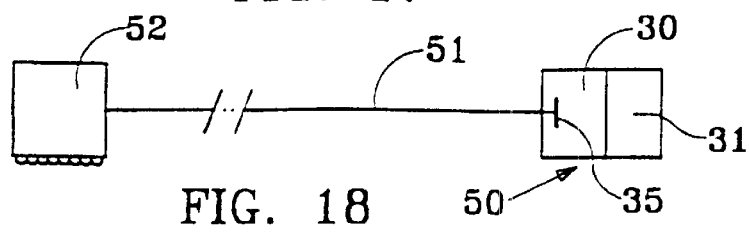
FIG. 18 shows an application of the invention to video surveillance.

FIG. 18 shows the case of a videophone whose camera 50 includes a device 31 and a transfer optical system 30 provided with a sensor 35. The image is transmitted over a cable 51 (or by radio) in n-image mode to a TV monitor 52 fitted with an array, and possibly also including an image processor device for display purposes, and/or a video recorder.

Two methods are described below for focusing the image transfer device:

1) in the first method, the transfer objective lens is a small-amplitude zoom lens;
   a) the cylindrical lens (or cylindrical doublet) is initially positioned so that its image focusing plane coincides with the focusing plane of the transfer optical system for the object $A_0$ on which focusing is being performed (horizontal focusing);
   b) the lens array is displaced so that its image plane (real or virtual) for the same object $A_0$ coincides with the above-specified focusing plane of the cylindrical lens, as seen by the transfer optical system (vertical focusing);
   c) the transfer optical system is zoomed, where appropriate, so that the image of the lens array corresponds to the width of the sensor; and
   d) when the cylindrical optical assembly includes a doublet, the doublet is adjusted by varying the distance between the two cylindrical lenses making it up (generally a converging cylindrical lens and a diverging cylindrical lens) so as to correct the anamorphosis ratio in application of the formulae given above.

Steps 1a) to 1d) are repeated when there is a change in focus.

2) In the second method, which is the preferred method, the transfer objective lens does not include a zoom function. The picture-taking device is initially adjusted by implementing steps 1a) and 1b) for a given focusing distance, e.g. infinity, or an average focusing distance (e.g. 3 m). The transfer optical system is set so that the image of the lens array corresponds to the width of the sensor.

Changes of focusing are performed by taking advantage of the fact that for an objective lens and thus for the transfer objective lens system, a small change in focusing (giving an image $A'_2$ instead of $A_2$) retains, to a first approximation, the field angle $\theta_0$ of the objective lens (see FIG. 5).

While focus is being changed, the lens array remains fixed.

Changing focus then consists in displacing the cylindrical optical assembly so as to cause the horizontal and vertical components of the image of the object $A_0$ situated at the desired focusing distance $\Delta$coincide, which image is formed through the cylindrical optical assembly and the lens array.

The cylindrical optical assembly and the lens array then have a common focusing plane which is slightly offset from the focal plane of the lens array.

Thereafter, the transfer optical system is focused on the common focusing plane so that the image of the object $A_0$ is sharp.

This procedure can be performed by computation and it can be automated.

A manual procedure consists in adjusting the focusing of the transfer objective lens system on the vertical component of the image as seen through the lens array, said image corresponding to an object situated at the desired focusing distance $\Delta$. Focusing of the horizontal component is then adjusted by displacing the cylindrical optical assembly.

When the cylindrical optical assembly includes a doublet, the spacing between the two cylindrical lenses constituting the doublet is initially varied so as to obtain the desired focal length $f_1$ which corresponds to correcting the anamorphosis ratio for the desired focusing distance, after which one or other of the two above-described procedures is implemented, during which the cylindrical optical assembly is displaced as indicated above.

These two procedures (automated and manual) can also be used, in application of the principle of light paths being reversible, for a projection or back-projection device fitted with an array and situated at a distance D. Under such circumstances, a projector, e.g. a CCD video projector or a cinema projector projects an n-image mode image so that the image is sharp in the common focusing plane, which plane is selected to be at the focusing distance $\Delta$ that corresponds to the distance D.

n normal-format images (de-anamorphosed images) are thus obtained on the screen ED. The ratio between the focal lengths of the lens array and of the cylindrical lens of the image-forming device is advantageously corrected by the factor k corresponding to the projection distance D.

The device of the invention, because of the reversibility of light paths, is thus suitable for implementing projection or back-projection devices, because it enables n elementary images to be projected which are transformed into normal format (non-anamorphosed) images by the n cylindrical lenticles of the device. In this type of operation, the focuses mentioned above as being object focuses and image focuses become respectively image focuses and object focuses.

The projection device (FIG. 19) is advantageously disposed at a distance D from the screen ED which is substantially equal to the nominal observation distance (the theoretical "solid color" distance), and it is preferably situated above the spectators.

It can project a video or film image over a distance D on the basis of an image I, I', or I", or I'" formed in the vicinity of its object focal plane F, F', F", or F'". In the first embodiment (FIGS. 1 and 5), the image I can be generated directly in the vicinity of the plane F, either in video, or by placing the film in the vicinity of the plane F, F', F", or F'".

A projector 32, e.g. a liquid crystal projector, projects images via its optical system onto the device 31, which images are obtained by the picture-taking device of the invention, or indeed it projects n-image mode images obtained in some other way, in particular in accordance with the Applicant's above-specified patents, or images that have been synthesized in n-image mode.

The device 31 which, in one of the four embodiments of the invention (FIGS. 5 to 12), projects these images in the form of n elementary images of non-anamorphic format through a distance D onto the screen ED which is generally a ground-glass screen, via the lens array RL having vertical axis lenticles, e.g. N/n lenticles which are used for viewing the images, where D designates the distance between the lens array $RL_1$ (or $RL_2$ or $RL_3$ or $RL_4$) and the screen projection lens array RL.

The dimensions of the diffusing screen ED and the distance D are selected so that the n normal format (i.e. non-anamorphic format) viewpoints that are projected fit in the frame of the screen ED.

Each of the lenticles of the lens array RL placed at the distance D of the projection device has a field angle $\theta'$ (see FIG. 21) which enables it to frame the lens array $RL_1$ (or $RL_2$, or $RL_3$, or $RL_4$) of width L, whence $\tan \frac{1}{2}\theta' = \frac{1}{2}L/D$.

The total stereoscopic baseline of the projection lens array $RL_1$ (or $RL_2$, or $RL_3$, or $RL_4$) is equal to 1.5 times the inter-pupil distance E of an observer (E=65 mm) when there are four viewpoints.

An observer whose eyes 10 are placed at the distance D from the screen ED which is thus set for the theoretical solid color distance (or nominal viewing distance) to be equal to D, then sees stereoscopic image pairs 1 & 3 and 2 & 4 with a stereoscopic baseline which is equal to the stereoscopic baseline B used for taking the pictures. Because of the uniform autostereoscopic properties as indicated above, and providing the stereoscopic baseline between two adjacent images is equal to half the distance between pupils E, or more generally to half the desired stereoscopic baseline B, there then exists a stereoscopic observation volume situated in a range $D_{min}$ to $D_{max}$ where $D_{min}<D<D_{max}$, and over quite a wide angle of observation, which in practice is of the order of 60° or more.

Naturally, it is possible to select n>4, either by conserving a stereoscopic baseline equal to 0.5 E between adjacent viewpoints, or by interleaving one or more additional viewpoints between the existing viewpoints, with adjacent viewpoints then having between them an elementary stereoscopic baseline of less than 0.5 E which elementary baseline is a submultiple of E, i.e. E/(m+1) where m is an integer. Under such circumstances, the solid color distance is determined so that the observer sees either viewpoints 1 and 2+m, or viewpoints 2 and 3+m, etc.

A back-projector constituting a preferred embodiment is shown in FIG. 20. As indicated above, it is possible to implement a back-projector in accordance with the above-specified French patents to project the n elementary images of images I, I', I", or I'" separately.

However, the device of the invention makes it possible to replace n elementary projectors as implemented in above-specified French patent 2 705 007, with a device of the invention having a single optical axis, and in particular a single objective lens. The network pitches respectively for projection $RC_1$ and for display $RC_2$, where $RC_1$ may be a lens array or a parallax array, as may $RC_2$, advantageously retain the values given in patent FR-2 705 007. In particular, the pitches of the lens arrays $RC_1$ and $RC_2$ can be, in video, less than half the size of a pixel projected on the screen ED, which is generally a ground glass screen. The optical condition that must be satisfied is that each element of the projection array $RC_1$, i.e. each lenticle when a lens array is used, coincides exactly with the lens array $RL_1$ (or $RL_2$, or $RL_3$, or $RL_4$). The condition for the field angle θ' is thus expressed in the same manner as for the projection device.

I.e. the distance between the back-projection device and the screen ED is D and the nominal distance for positioning the spectator, i.e. the nominal solid color distance is D'.

For an array $RC_1$ of pitch $Pr_1$ and an array $RC_2$ of pitch $Pr_2$, the conditions are as follows:

firstly, the projection array $RC_1$ must be designed so that each of its lenses has a field angle θ' corresponding to the same conditions as the array RL of FIG. 19, i.e. each lens of the array RL sees the lens array of the projection device at a distance D.

In addition, for a desired solid color distance D', the following must be satisfied:

$$\frac{Pr_1}{Pr_2} = \frac{D}{D'} \frac{(fr_2 + D')}{(fr_1 + D)}$$

where $fr_1$ and $fr_2$ designate the focal lengths of the cylindrical lenses of the projection array $RC_1$ and of the display array $RC_2$.

It will be observed that in the case both of FIG. 19 and of FIG. 20, one or both arrays can be an array of the parallax barrier type.

With a video image, the pitches of the arrays RL, $RC_1$ and $RC_2$ are advantageously smaller than or equal to half the size of an image point or pixel on the screen E. The pitches of the arrays RL, $RC_1$, and $RC_2$ can be selected to be as small as possible given the grain of the ground glass constituting the screen E. If the arrays are of pitch that is too small, then the grain size gives rise to a loss of definition, so for example, said pitch can lie in the range 0.1 times to 0.5 times the size of a pixel on the screen E.

A problem that needs to be taken into account for projection or back-projection, or indeed when viewing on a screen, is that of autostereoscopy.

If, when taking a picture, viewpoint $I_1$ of stereoscopic pair ($I_1$, $I_3$) corresponds to the left eye while viewpoint $I_3$ corresponds to the right eye, and if viewpoint $I_2$ of stereoscopic pair ($I_2$, $I_4$) corresponds to the left eye while viewpoint $I_4$ to the right eye, then it is necessary to ensure that the same is true for the spectator: vision is then said to be orthostereoscopic.

For example if the left eye of the spectator sees viewpoint $I_3$ while the right eye sees viewpoint $I_1$, then the perception of relief is inverted, such that projections are seen as depressions and vice versa: vision is then said to be pseudostereoscopic.

In the first and second embodiments, the lens arrays $RL_1$ and $RL_2$ are converging.

The resulting viewpoints $I_1$ to $I_4$ and $I''_1$ to $I''_4$ respectively as seen through the device, are respectively upside-down and subject to right-left inversion, and rightway up and subject to right-left inversion. This is represented in the respective circles in FIGS. 1 and 3 which show the appearance of the letter P on the left of the drawing.

In the second and fourth embodiments, the lens arrays $RL_2$ and $RL_4$ are diverging.

The resulting viewpoints $I'_1$ to $I'_4$ and $I'''_1$ to $I'''_4$, as seen through the device, are respectively upside-down and not subjected to right-left inversion, and not upside-down and not subjected to right-left inversion. This is likewise represented in FIGS. 2 and 4 by showing the appearance of the letter P on the left of the drawing.

Between picture-taking and projection, it is necessary to compensate for permutations such that the images are seen the rightway up and in the right order. This condition can be satisfied by making a system that associates a picture-taking device of the invention with a projection device of the invention, whether using video or film. This is always possible since the four embodiments described correspond to all four possible situations.

It will be observed that with film, a small amount of lateral displacement of the film relative to the projection device gives rise on viewing to the entire image being displaced without disturbing the viewing of relief.

FIG. 22 shows the "solid color" condition for viewing on a television screen. The image comprises columns of interleaved pixels. Each lenticle of the array RV of pitch $P_r$ corresponds to n columns of pixels on the screen. The centers C of the lenticles are at a distance ΔD from the plane of the pixels on the screen such as 43 or 53. The pixel pitch is pp. $P=np_p$. At the "solid color" distance D, the following applies in conventional manner:

$$P/P_r=(D+\Delta D)/D$$

The condition for uniform autostereoscopy (observing two viewpoints separated by m intermediate viewpoints) is:

$$\Delta D=(m+1)p^p \, D/E$$

What is claimed is:

1. An autostereoscopic image-forming device having n viewpoints, said device including a lens array comprising cylindrical lenticles disposed side by side and having longitudinal axes parallel to a first direction perpendicular to an optical axis of the device, the device including a cylindrical optical assembly comprising at least one cylindrical lens whose longitudinal axis is perpendicular to the first direction and to said optical axis, the lens array including n cylindrical lenticles, wherein the lens array and the cylindrical optical assembly share a common focusing plane, and wherein the absolute value of the ratio between the focal length of the cylindrical optical assembly and the focal length of the lenticles of the lens array is substantially equal to n, said device also comprising at least one converging element causing light rays parallel to said optical axis or coming from a given point situated on said optical axis, and passing through the centers of the lenticles of the lens array to converge on a common convergence point, and also comprising a coupling device with a transfer optical system so arranged that said common convergence point is situated in the entrance pupil of said transfer optical system.

2. A device according to claim 1, wherein the cylindrical optical assembly is converging and the lens array is also converging.

3. A device according to claim 1, wherein the cylindrical optical assembly is converging and the lens array is diverging.

4. A device according to claim 1, wherein the cylindrical optical assembly is diverging and that the lens array is converging.

5. A device according to claim 1, wherein the cylindrical optical assembly is diverging and the lens array is also diverging.

6. A device according to claim 1, wherein the absolute value of said ratio between the focal length of the cylindrical optical assembly and the focal length of the lenticles of the lens array is equal to n*, where n* is equal to nk, and k being a magnification ratio correction coefficient such that for an object situated at a given distance, each of the viewpoints of the image has an anamorphosis ratio whose absolute value is equal to n.

7. A device according to claim 6, wherein the cylindrical optical assembly has a variable focal length, and said assembly includes means for modifying its focal length and thus for modifying the value of the correction coefficient k while keeping the focusing planes of the cylindrical optical assembly and of the lens array in coincidence.

8. A device according to claim 1, wherein the optical assembly includes two cylindrical lenses forming a doublet.

9. A device according to claim 1, wherein said lens array additionally includes at least one plane surface disposed downstream from each lenticle of said lens array that is inclined relative to a plane PL normal to the optical axis such that light rays parallel to the optical axis and passing through the optical centers of the lenticles converge on a given common convergence point.

10. A picture-taking device, including, in combination, an image-forming device according to claim 1 for forming an image and an image acquisition device having said transfer optical system arranged for centering said image and focusing on said image.

11. A device according to claim 10, wherein the image acquisition device is a video device comprising means for focusing on a video sensor so as to constitute a video picture-taking device.

12. A device according to claim 11, wherein the image-forming device and the video device are incorporated in an endoscope having a stereoscopic baseline B smaller than the distance E between the pupils of an observer.

13. A device according to claim 11, wherein the image-forming device and the video device are incorporated in a videophone.

14. A device according to claim 11, wherein the video device is a video camera, focused on said image, said image-forming device constituting an optical accessory for the video camera.

15. A device according to claim 10, wherein the image acquisition device includes a device for focusing on a film.

16. A device according to claim 15 wherein the device for focusing on a film is a camera for taking cinema pictures.

17. A device according to claim 10, wherein the image-forming device includes one plane surface associated with each lenticle of the lens array, and said given convergence point is situated in the entrance pupil of the transfer optical system.

18. An image projection device including an image-forming device according to claim 1, wherein said transfer optical system is an image projector forming on said common focusing plane an image including n flat elementary images of anamorphic format, and a screen fitted with at least one projection array, said projection array being situated at a distance D from the lens array of the image-forming device which is equal to the nominal viewing distance, the cylindrical lens and the lens array of the image-forming device being positioned in such a manner that the image situated in the object focusing plane is projected to the distance D by the image-fanning device, the field angle of the elements of the projection array is such that each element frames the lens array of the image-forming device horizontally, and said lens array has two non-contiguous lenticles whose axes are spaced apart by the distance between the pupils of an observer.

19. A device according to claim 18, wherein said screen is a direct projection screen having a diffusing and reflecting element with the projection array placed in front thereof, which array also constitutes a viewing array.

20. A device according to claim 18, wherein said screen is a back-projection screen having a diffusing element disposed between said projection array and a viewing array.

21. A device for projecting images according to claim 18, wherein the projector is a video projector, and the projection array and/or the display array have a pitch that is less than or equal to half the size of an image point or pixel on the screen.

22. An autostereoscopic video system, which includes a picture-taking device and an image projection device according to claim 18.

* * * * *

UNITED STATES PATENT AND TRADEMARK OFFICE
CERTIFICATE OF CORRECTION

PATENT NO.    : 6,574,042 B2
DATED         : June 3, 2003
INVENTOR(S)   : Allio

It is certified that error appears in the above-identified patent and that said Letters Patent is hereby corrected as shown below:

Title page,
Item [56], References Cited, OTHER PUBLICATIONS, "*VII*" should read -- *VIII* --.

Column 8,
Line 16, "1+-" should read -- 1+ --.

Column 16,
Line 57, "p$^p$" should read -- p$_p$ --.

Column 18,
Line 34, "image-fanning" should read -- image-forming --.

Signed and Sealed this

Nineteenth Day of August, 2003

JAMES E. ROGAN
*Director of the United States Patent and Trademark Office*